(12) United States Patent
Miller

(10) Patent No.: US 6,745,107 B1
(45) Date of Patent: Jun. 1, 2004

(54) SYSTEM AND METHOD FOR NON-INVASIVE DIAGNOSTIC TESTING OF CONTROL VALVES

(75) Inventor: Randy Marvin Miller, Thousand Oaks, CA (US)

(73) Assignee: Honeywell Inc., Morristown, NJ (US)

( * ) Notice: Subject to any disclaimer, the term of this patent is extended or adjusted under 35 U.S.C. 154(b) by 755 days.

(21) Appl. No.: 09/607,392

(22) Filed: Jun. 30, 2000

(51) Int. Cl.$^7$ .......................... G06F 11/00; G21C 17/00
(52) U.S. Cl. ........................ 700/282; 702/185
(58) Field of Search ................. 700/281, 282, 700/44–52, 28–34; 702/179–185, 105, 33–35, 41–44; 73/168, 116, 1.72, 47, 48, 219–226, 861.79–861.84, 865.9

(56) References Cited

U.S. PATENT DOCUMENTS

| | | | | |
|---|---|---|---|---|
| 4,566,310 A | * | 1/1986 | Cohen et al. ............ | 73/9 |
| 4,693,113 A | * | 9/1987 | McNennamy et al. ..... | 73/168 |
| 4,844,110 A | * | 7/1989 | Paley ................... | 137/1 |
| 5,197,328 A | * | 3/1993 | Fitzgerald ............. | 73/168 |
| 5,566,092 A | * | 10/1996 | Wang et al. ............ | 702/185 |
| 5,573,032 A | * | 11/1996 | Lenz et al. ............ | 137/486 |
| 5,594,175 A | * | 1/1997 | Lyon et al. ........... | 73/593 |
| 5,705,742 A | * | 1/1998 | Fox et al. ............. | 73/116 |
| 5,966,679 A | * | 10/1999 | Snowbarger et al. ..... | 702/105 |
| 6,330,525 B1 | * | 12/2001 | Hays et al. ............ | 702/183 |
| 6,453,261 B2 | * | 9/2002 | Boger et al. .......... | 702/138 |
| 6,466,893 B1 | * | 10/2002 | Latwesen et al. ....... | 702/179 |

* cited by examiner

Primary Examiner—Maria N. Von Buhr
(74) Attorney, Agent, or Firm—Davis Munck (57) ABSTRACT

A system and method for detecting malfunctions in control valves is disclosed. The system comprises a test unit that is capable of being coupled to a feedback controller that is coupled to a control valve. From the feedback controller the test unit obtains process variable data and output data associated with the control valve. A test unit controller in the test unit 1) forms a data pattern from the process variable data and output data associated with the control valve, and 2) compares the data pattern with a diagnostic data pattern of a valve malfunction or valve fault. When the data pattern matches the diagnostic data pattern of the valve fault, the test unit controller determines that the control valve is experiencing a valve fault. The system and method of the present invention does not require the control valve to be taken out of operation during the diagnostic testing.

26 Claims, 10 Drawing Sheets

SYSTEM AND METHOD FOR NON-INVASIVE DIAGNOSTIC TESTING OF CONTROL VALVES

TECHNICAL FIELD OF THE INVENTION

The present invention is directed, in general, to process control systems and, more specifically, to a system and method for providing a non-invasive diagnostic procedure for testing the operational performance of control valves.

BACKGROUND OF THE INVENTION

Many process facilities (e.g., a manufacturing plant, a mineral or crude oil refinery, etc.) are managed using distributed control systems. Typical contemporary control systems include numerous modules tailored to monitor and/or control various processes of the facility. Conventional means link these modules together to produce the distributed nature of the control system. This affords increased performance and a capability to expand or reduce the control system to satisfy changing facility needs.

Industrial control systems often employ feedback controllers for controlling the operation of one or more operating units of the system such as a heater, a pump, a motor, a valve, or a similar item of equipment. In a feedback controller a command is sent to the feedback controller that represents a desired value or setpoint ("SP") for a process variable (e.g., a desired pressure, a desired temperature, a desired flow rate). A feedback signal is also sent to the feedback controller that indicates the actual value of the process variable ("PV") (e.g., the actual pressure, the actual temperature, the actual rate of flow). An error signal is calculated utilizing the difference between the setpoint command and the feedback signal that indicates the actual value of the process variable.

From the error signal, the feedback controller calculates a change command to change the current setting of the operational unit. For example, if the operational unit is a motor, the change command would cause the speed of the motor to change (either increase or decrease) in order to cause the actual value of the process variable to more closely approach the desired setpoint value for the process variable.

In a simple feedback controller, the change command is proportional to the error signal. In more complex feedback controllers, the change command may be a more complex function of the error signal. One common type of feedback controller is known as a Proportional, Integral, Derivative ("PID") controller. PID controllers are capable of calculating a variety of functional relationships between an error signal and a change command signal in a feedback control system.

The relationship between the error signal and the change command greatly affects the characteristics of the control system. These characteristics include (a) the "response time" of the system (i.e., how fast the operational unit responds to the new change command); (b) the "overshoot" of the system (i.e., how much the operational unit initially exceeds its new setting); and (c) the "damping ratio" of the system (i.e., how long the output values of the operational unit oscillate before eventually stabilizing at the new setting).

Industrial control systems often employ numerous control valves controlled by feedback controllers. It is not unusual for a control system to employ hundreds of control valves. In the process control industry it is difficult to effectively diagnose large numbers of control values to determine which control valves are malfunctioning. The maintenance and repair of control valves is generally conducted on an "ad hoc" basis.

Control valves that malfunction significantly may be detected when the malfunction is noticed. However, there are many control valves that malfunction at a level that is not easily detectable. The malfunctions of such control valves normally go undetected. As a result, it is not unusual in the process control industry to repair control valves that are functioning within acceptable limits while failing to repair control valves that may be in serious need of repair.

In order to detect malfunctioning control valves, it is necessary to conduct thorough diagnostic tests. The prior art techniques that are currently available for diagnosing the performance of control valves employ invasive tests that require a control valve that is being tested to be taken out of operation during the test. The prior art diagnostic processes use specially designed diagnostic test equipment to manipulate the components of a control valve and monitor the performance of the components. The prior art diagnostic processes are also expensive.

Because the prior art diagnostic processes are expensive and require the control valves to be taken out of operation, only a small fraction of control valves are diagnosed in this manner.

There is therefore a need in the art for an improved system and method for providing inexpensive and non-invasive diagnostic testing of the operational performance of control valves.

SUMMARY OF THE INVENTION

A primary purpose of the present invention is to provide an improved system and method for providing inexpensive and non-invasive diagnostic testing of the operational performance of control valves.

The system of the present invention comprises a test unit that is capable of detecting malfunctions (known as "valve faults") in a control valve while the control valve remains in operation. The test unit of the present invention comprises a data acquisition unit that measures values of the setpoint ("SP") signal, the process variable ("PV") signal, and the feedback controller output ("OP") signal. A diagnostic test application within the test unit uses the PV and OP data to create a distinctive PV and OP data pattern for each mode of operation of the control valve. The diagnostic test application creates and records diagnostic PV and OP data patterns for 1) the control valve operating normally, and for 2) the control valve operating with each known type of valve fault. The test unit compares these recorded PV and OP data patterns to PV and OP data patterns obtained from a control valve under test. The comparison and matching of PV and OP data patterns enables the test unit to detect and identify valve faults in the control valve without taking the control valve out of operation. The system and method of the present invention may be used in any type of process control system that has control valves.

It is an object of the present invention to provide an improved system and method for diagnosing the operational performance of a control valve without taking the control valve out of operation.

It is also an object of the present invention to provide an improved system and method for creating a diagnostic data pattern that indicates the normal operation of a control valve.

It is an additional object of the present invention to provide an improved system and method for creating a data pattern that indicates when a control valve is experiencing a valve fault.

It is an object of the present invention to provide an improved system and method for comparing the data pattern of a control valve to previously recorded diagnostic data patterns of a control valve.

It is also an object of the present invention to provide an improved system and method for detecting and identifying valve faults in a control valve by comparing a data pattern of the control valve with a previously recorded data pattern of a control valve that experienced a valve fault.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 11, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged process facility.

Figure 1:
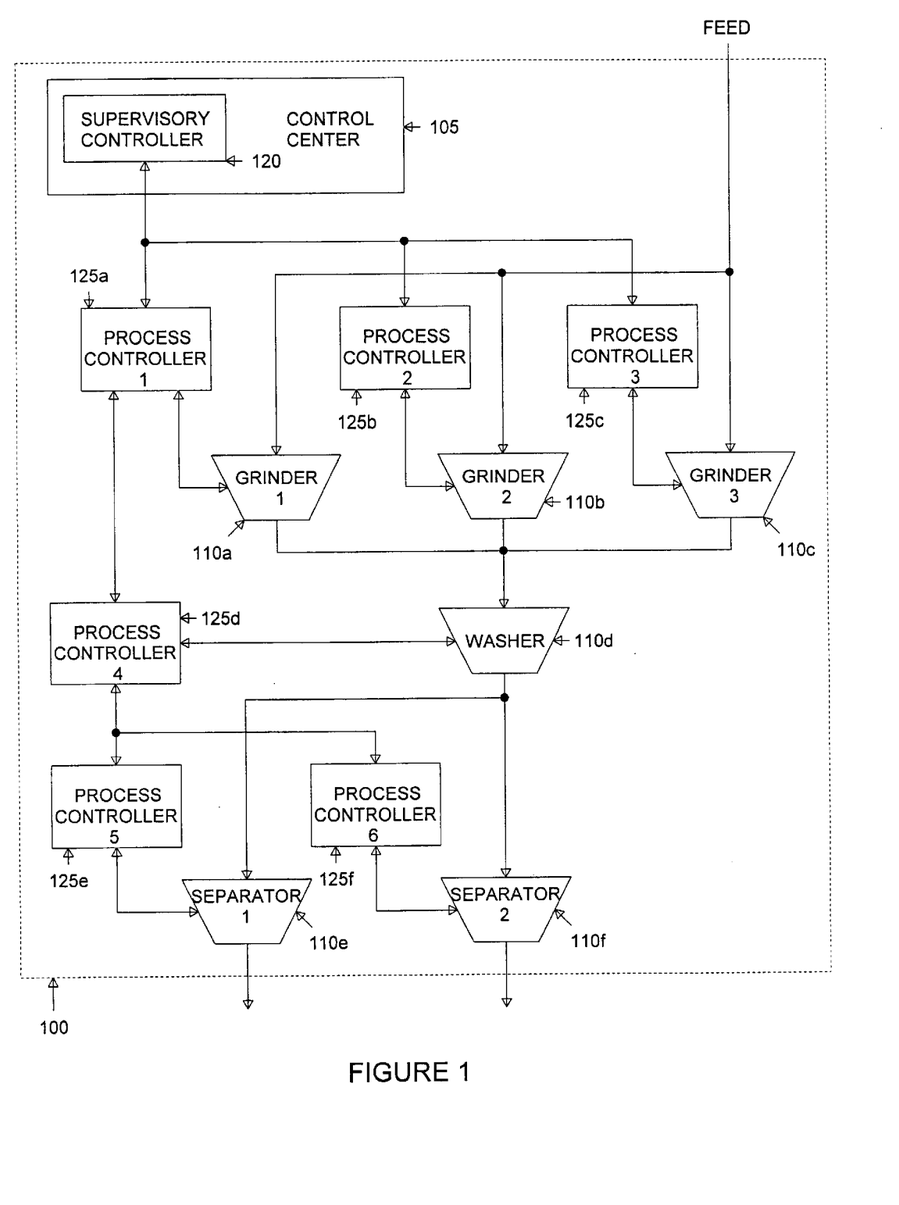
FIG. 1 illustrates a block diagram of a process facility in which a control system according to the principles of the present invention may be used.

FIG. 1 illustrates a block diagram of a process facility 100 in which a control system according to the principles of the present invention may be implemented. Exemplary process facility 100 processes raw materials, and includes a control center 105 and six associated processes, items 110a–110f, arranged in three stages. The term "include," as used herein, means inclusion without limitation. Exemplary control center 105 may comprise a central area that is commonly manned by an operator (not shown) for monitoring and controlling the three exemplary process stages. A first process stage includes three raw material grinders 110a–110c that receive a feed of raw material and grind the same, such as by using a pulverizer or a grinding wheel, into smaller particles of raw material. The second process stage includes a washer 110d that receives the ground raw materials and cleans the same to remove residue from the first stage. The third process stage includes a pair of separators 110e and 110f that receive the ground, washed raw materials and separate the same into desired minerals and any remaining raw materials. Since this process facility is provided for purposes of illustration only and the principles of such a facility are well known, further discussion of the same is beyond the scope of this patent document and unnecessary.

The exemplary control system includes a supervisory controller 120 and six process nodes, or process controllers 125a–125f, each of which is implemented in software and executable by a suitable conventional computing system (standalone or network), such as any of Honeywell, Inc.'s AM K2LCN, AM K4LCN, AM HMPU, AxM or like systems. Those skilled in the art will understand that such controllers may be implemented in hardware, software, or firmware, or some suitable combination of the same. In general, the use of computing systems in control systems for process facilities is well known.

Supervisory controller 120 is associated with each of process controllers 125, directly or indirectly, to allow the exchange of information. The phrase "associated with" and derivatives thereof, as used herein, may mean to include within, interconnect with, contain, be contained within, connect to or with, couple to or with, be communicable with, cooperate with, interleave, be a property of, be bound to or with, have, have a property of, or the like. Supervisory controller 120 monitors characteristics (e.g., status, temperature, pressure, flow rate, current, voltage, power, utilization, efficiency, cost and other economic factors, etc.) of associated processes 110, either directly or indirectly through process controllers 125 associated with processes 110. Depending upon the specific implementation, such monitoring may be of an individual process, a group of processes, or the whole facility.

Supervisory controller 120 communicates with associated processes 110 via process controllers 125 and generates supervisory data in order to optimize process facility 100. The phrase "supervisory data," as used herein, is defined as any numeric, qualitative or other value generated by supervisory controller 120 to control (e.g., direct, manage, modify, recommend to, regulate, suggest to, supervise, cooperate, etc.), for example, a particular process, a group of processes, the whole facility, a process stage, a group of stages, a sequence of processes or stages, or the like, to optimize the facility as a whole. In a preferred embodiment, the supervisory data is dynamically generated and is based at least upon a given facility's efficiency, production or economic cost, and most preferably all three.

Process controllers 125 monitor associated processes 110 and operate to varying degrees in accordance with the supervisory data to control the associated processes, and, more particularly, to modify one or more processes and improve the monitored characteristics and the facility as a whole. The relationship between supervisory controller 120 and various ones of process controllers 125 may be master-slave (full compliance), cooperative (varying compliance, such as by using the supervisory data as a factor in controlling the associated processes), or complete disregard (noncompliance). Depending upon the specific implementation and the needs of a given facility, the relationship between supervisory controller 120 and a specific process controller 125 may be static (i.e., always only one of compliance, cooperative, or noncompliance), dynamic (i.e., varying over time, such as within a range between compliance and noncompliance, or some lesser range in between), or switching between static periods and dynamic periods.

FIG. 1 depicts the process controllers 125*a–f* as simple logical blocks coupled to the processes 110*a–f* for purposes of illustration only. In reality, the process controllers 125*a–f* may be implemented in process facility 100 as any of a wide range of devices. In the simplest embodiments, an exemplary process controller 125 may be micro-controller circuit fabricated on a circuit board and integrated into one of the processes 110 (i.e., part of a separator, washer, or grinder) that is being controlled. In other embodiments, an exemplary process controller 125 may be a stand-alone computer, such as a personal computer ("PC"), that is remote from the controlled process 110 and coupled to it by a bus architecture.

In more complex embodiments, an exemplary process controller 125 may be a network node coupled to one or more process(es) 110 by a network architecture. The supervisory controller 120 may then treat the network containing the exemplary process controller 125 and its associated processes 110 as a single functional group. Finally, an exemplary process controller 125 may be a group of process controllers and their associated processes 110 that are networked together. The networked group may then be treated as a single functional group by supervisory controller 120.

The process controllers 125*a–f* produce process data that is used by the supervisory controller 120 for a variety of purposes, including generating the supervisory data and distributing the process data to one or more client applications. Process data may also be used by the process controller 125 that produced it to control the associated process 110. For example, a process controller 125 may read physical parameter data from a process 110, such as temperature, pressure, flow rate, and the like, and use some or all of that process data and, perhaps, some supervisory data to control the process 110. This is particularly true in a feedback-controlled process.

Process data may be transferred directly between process controllers 125*a–f* in a peer-to-peer relationship, as in a LAN network. For example, process controller 4, which controls the washer (item 110*d*), may request process data from process controllers 1–3, which control grinders 1–3, in order to determine the rate at which ground raw material is being output from grinders 1–3. The washer may thereby adjust the rate at which it washes the ground material. For example, the washer may reduce the amount of power that it uses to wash the ground raw material when the amount of ground raw material being sent to the washer is relatively low. It may even temporarily shut down in order to "hold and wait" for a suitable amount of ground raw material to accumulate before it resumes washing.

In some embodiments of the present invention, the supervisory controller 120 may comprise a LAN, a group of connected LANs, or a WAN architecture. One or more client applications are executed on nodes of the LAN/WAN architecture. The nodes may be, for example, personal computers ("PCs"). The client applications may all require the same process data and supervisory data to be transferred at the same update rate from the process controllers. However, a more likely scenario is that the client applications require different, possibly over-lapping, subsets of the process data and supervisory data and require the process data and supervisory data to be transferred at different update rates to different client applications.

The present invention comprises a system and method for providing a non-invasive diagnostic procedure for testing the operational performance of control valves. As will be more fully described, the present invention uses information from the process controller that monitors and regulates a control valve to detect and identify when the control valve is experiencing a valve fault.

Figure 2:
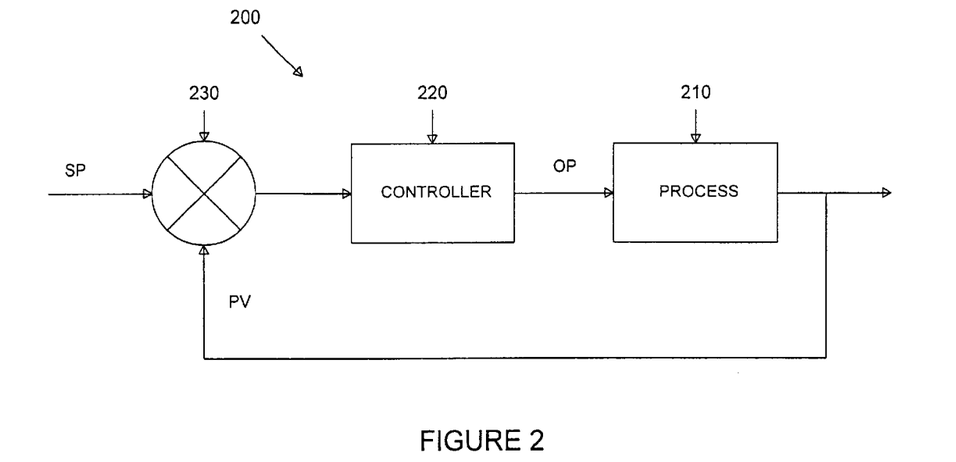
FIG. 2 illustrates a block diagram of a generic control system showing a process controlled by a feedback controller.

FIG. 2 is a block diagram of generic control system 200 showing process 210 controlled by feedback controller 220. Feedback controller 220 receives a setpoint value ("SP") signal that represents the desired operating point for process 210. Feedback controller 220 also receives a feedback signal from process 210 that represents the actual value of a process variable ("PV") at the output of process 210. The SP signal and the PV signal are combined in summing point 230 to generate an error signal for feedback controller 220. Feedback controller 220 uses the error signal to generate a new command signal to change a variable in process 210. The output of feedback controller 220 is labeled with the letters "OP" (for "output"). For convenience, feedback controller 220 will be referred to as controller 220.

Figure 3:
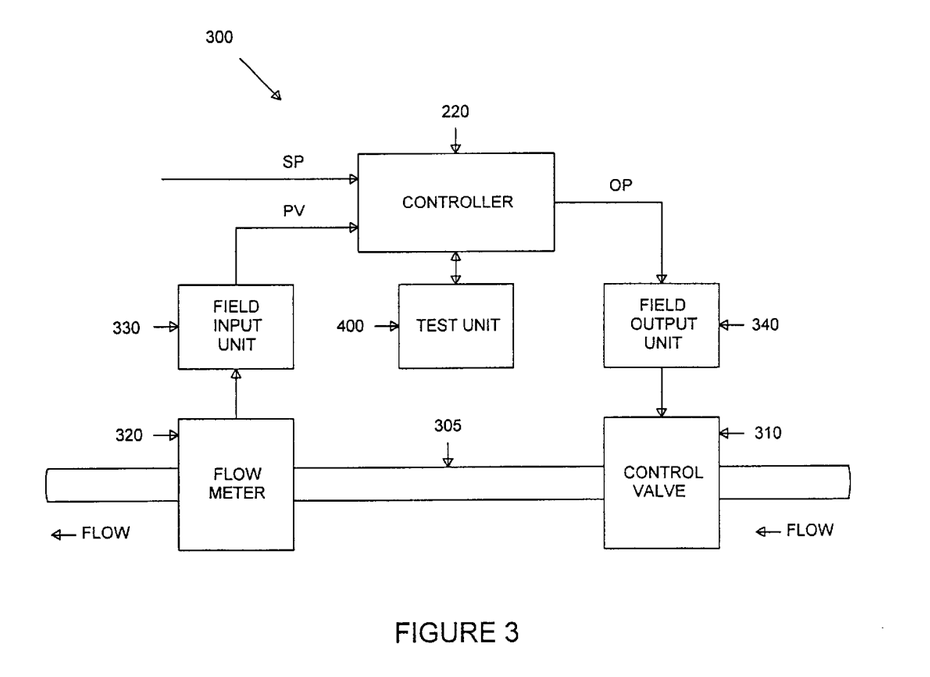
FIG. 3 illustrates a block diagram of an exemplary control system for regulating the flow of liquid in a pipe comprising a feedback controller, a flow control valve and a flow meter. Also illustrated is a test unit of the present invention coupled to the feedback controller of the control system.

FIG. 3 illustrates a block diagram of an exemplary control system 300 for regulating the flow of liquid in pipe 305. Control system 300 comprises controller 220, flow control valve 310 and flow meter 320. A pump (not shown) moves fluid under pressure through control valve 310 and through flow meter 320 (from right to left in FIG. 3). Controller 220 receives a setpoint value ("SP") signal that represents the desired operating point for control valve 310. Flow meter 320 is a measurement device that is capable of measuring the flow of liquid in pipe 305. The rate of flow of liquid in pipe 305 is the process variable ("PV") for control system 300.

The output of flow meter 320 is coupled to field input unit 330. Field input unit 330 receives an analog signal from flow meter 320 that represents the measured rate of flow of the liquid in pipe 305. Field input unit 330 converts the analog signal to a digital signal and sends the digital signal to controller 220. The digital signal is a PV signal that represents the measured rate of fluid flow. The magnitude of the PV signal is directly proportional to the control valve setting of control valve 310.

The SP signal and the PV signal are combined in a summing point (not shown) within controller 220 to generate an error signal for controller 220. Controller 220 uses the error signal to generate a digital signal to change the control valve setting of control valve 310 to cause the value of the process variable ("PV") (i.e., the rate of fluid flow) to more closely match the setpoint value. As previously mentioned, the output of controller 220 is labeled with the letters "OP" (for "output").

The output of controller 220 is coupled to field output unit 340. Field output unit 340 receives a digital signal from controller 220 that represents a new calculated value for the valve setting of control valve 310 (i.e., a new OP value). Field output unit 340 converts the digital OP signal to an analog OP signal for changing the valve setting of control valve 310 and sends the analog OP signal to control valve 310. The magnitude of the analog OP signal is directly proportional to the new control valve setting for control valve 310. In response to the new value for the OP signal, control valve 310 changes its valve setting. This causes a change in the rate of fluid flow through pipe 305 and flow meter 320.

FIG. 3 also illustrates an advantageous embodiment of the present invention in which test unit 400 is coupled to controller 220 of control system 300. Test unit 400 is capable of detecting malfunctions (known as "valve faults") in control valve 310. As will be more fully described, test unit 400 is capable of detecting valve faults in control valve 310 without requiring control valve 310 to be taken "off-line" (i.e., out of operation). Test unit 400 detects valve faults using the setpoint ("SP") signal, the process variable ("PV") signal, and the output ("OP") signal.

Although FIG. 3 shows test unit 400 coupled to controller 220, it is possible to couple test unit 400 to control valve 310 and flow meter 320 (through appropriate input/output connections). Test unit 400 is usually coupled to controller 220 because controller 220 is the most convenient place to acquire the current values of the setpoint ("SP") signal, the process variable ("PV") signal, and output ("OP") signal.

Figure 4:
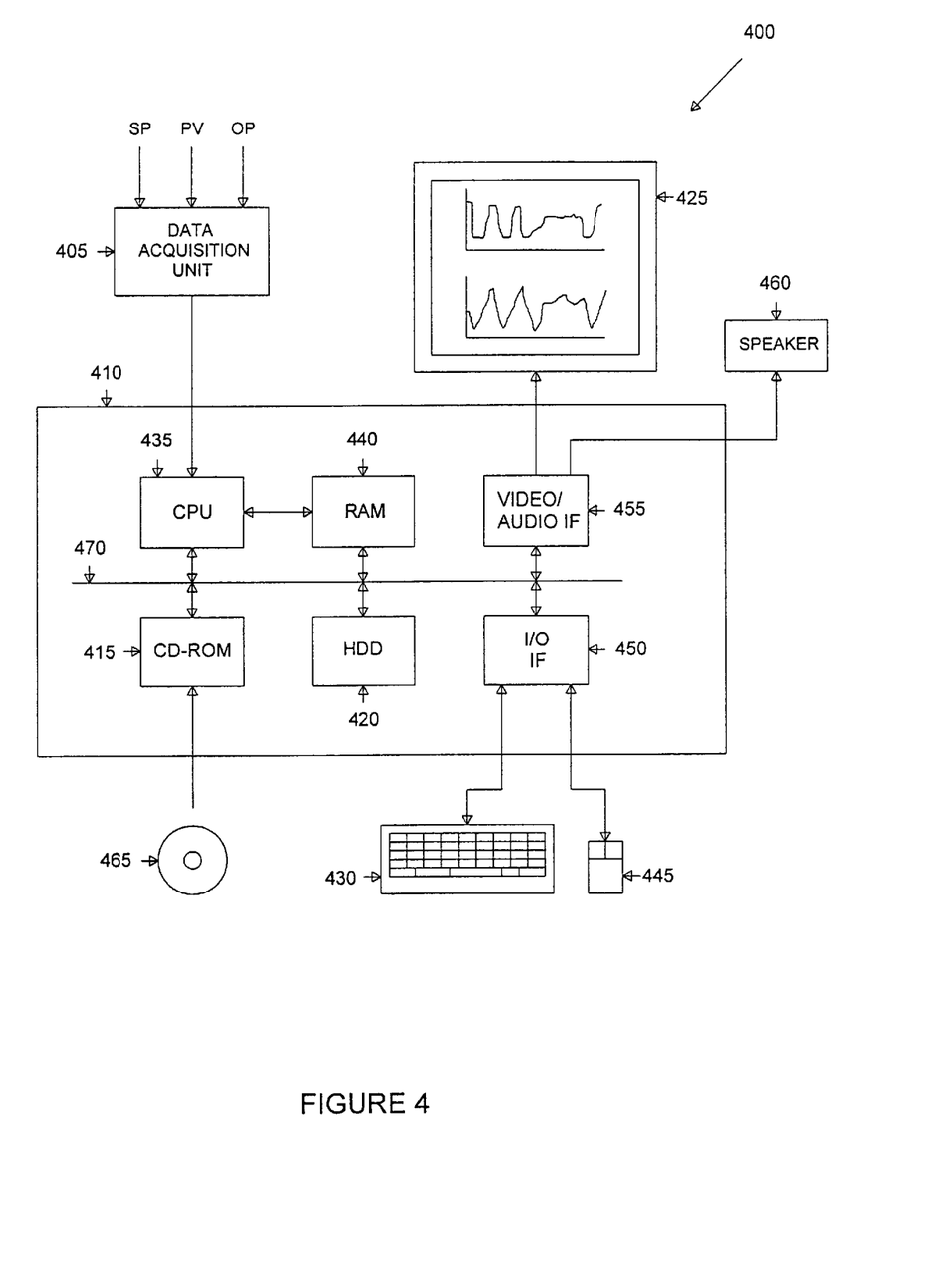
FIG. 4 illustrates an advantageous embodiment of the test unit of the present invention.

FIG. 4 illustrates a block diagram of an exemplary test unit 400 for the non-invasive diagnostic testing of control valve 310. In an advantageous embodiment of the present invention, test unit 400 comprises data acquisition unit 405 and personal computer (PC) 410. It is understood that the present invention is not limited to use in a personal computer and that other types of equipment may be used to practice the invention. Personal computer 410 comprises a compact disk (CD) read-only-memory (ROM) disk drive 415, hard disk drive (HDD) 420, display monitor 425, keyboard 430, central processing unit (CPU) 435, random access memory (RAM) 440, pointing device 445 (e.g., a computer mouse), input/output (I/O) interface (IF) circuit 450, video/audio interface (IF) circuit 455, and speaker 460. CD-ROM disk drive 415 is capable of receiving and reading removable CD-ROM disk 465. Display monitor 425 serves as the computer monitor for personal computer 410.

Hard disk drive 420 provides fast access for storage and retrieval of operating system programs, application programs, and data. Keyboard 430 and pointing device 445 are coupled to personal computer 410 through I/O interface circuit 450. Display monitor 425 and speaker 460 are coupled to personal computer 410 through video/audio interface circuit 455. The internal components of personal computer 410, including CD-ROM disk drive 415, hard disk drive 420, CPU 435, RAM 440, I/O interface circuit 450, and video/audio interface circuit 455, are coupled to each other and communicate with each other through computer bus 470.

Data acquisition unit 405 is coupled to CPU 435 of personal computer 410. Data acquisition unit 405 of test unit 400 is coupled to controller 220 when test unit 400 is being used to test control valve 310. Data acquisition unit 405 receives signals that represent the current values of the setpoint ("SP") signal, the process variable ("PV") signal, and output ("OP") signal. Data acquisition unit 405 provides these signals to CPU 435.

Figure 5:
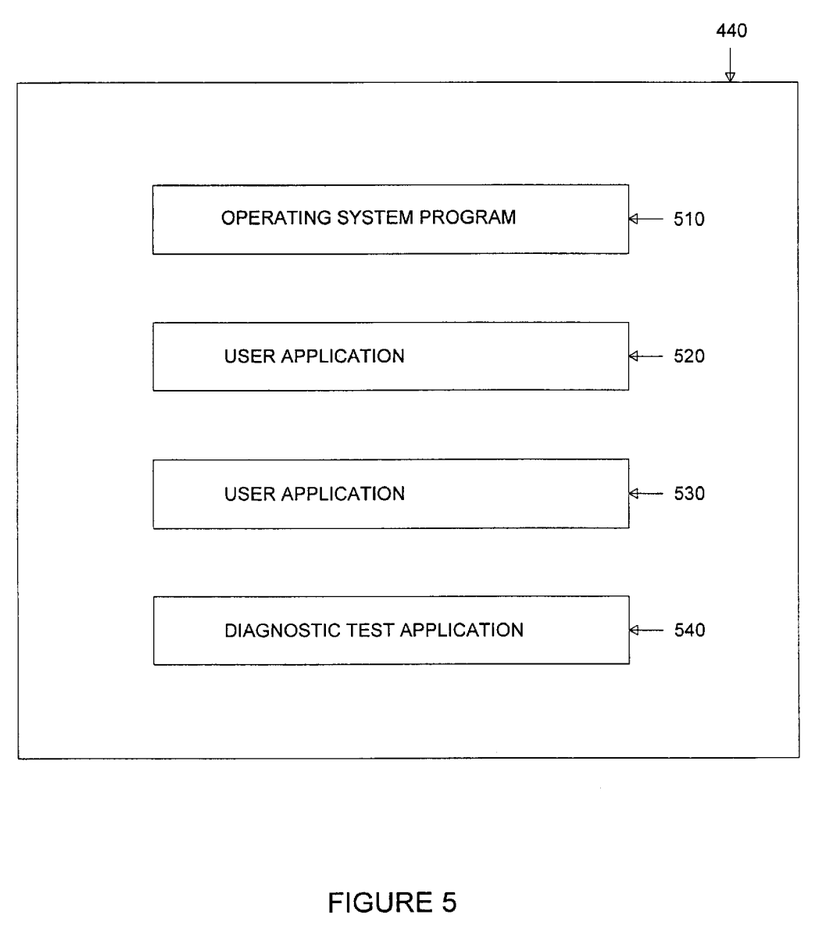
FIG. 5 illustrates selected portions of random access memory within the test unit of the present invention.

FIG. 5 illustrates selected portions of RAM 440 within personal computer 410 according to one embodiment of the present invention. RAM 440 stores operating system program 510 and application software. The application software comprises user application 520, user application 530, and diagnostic test application 540. Computer software in personal computer 410 may also comprise other application software (not shown). Operating system program 510 and the application software are loaded onto hard disk drive 420 from one or more CD-ROM disks 465. Hard disk drive 420 provides non-volatile storage for the loaded software until one or more of the software programs are deleted from hard disk drive 420.

Diagnostic test application 540 may also be stored on any removable storage medium, which may be, for example, a 3.5 inch floppy diskette (not shown), CD-ROM disk 465, a digital video disk (DVD) (not shown), or a similar storage medium.

CPU 435 and diagnostic test application 540 together comprise a test unit controller that is capable of carrying out the present invention. As will be more fully described, diagnostic test application 540 uses the current values of the setpoint ("SP") signal, the process variable ("PV") signal, and output ("OP") signal to detect valve faults in control valve 310.

Diagnostic test application 540 comprises software for monitoring and analyzing the operation of control valve 310. Because the setpoint ("SP") signal is usually a constant, the primary task of diagnostic test application 540 is to analyze changes in the values of the PV signal and the OP signal. For convenience, the values of the PV signal and the OP signal will sometimes be collectively referred to as the "PV and OP data."

Diagnostic test application 540 utilizes digital signal processing techniques to analyze the PV and OP data for different modes of operation of control valve 310. The PV and OP data are measured and recorded during normal operations of control valve 310. Then the PV and OP data are measured and recorded for each type of known valve fault. For example, a common type of valve fault is known as the "stick-slip" fault (or "stiction"). When control valve 310 exhibits the "stick-slip" fault, the position of the control valve setting in control valve 310 becomes stuck and is constant for a period of time called the "valve stick period." The control valve setting later slips abruptly and causes the PV value to change abruptly. The "stick-slip" behavior disturbs the operation of control valve 310 and causes a decrease in process efficiency. Prior art methods of detecting "stick-slip" behavior use invasive diagnostic tests that require control valve 310 to be taken out of operation during the testing procedure.

In contrast, diagnostic test application 540 of the present invention is capable of detecting "stick-slip" valve faults (and other types of valve faults) while control valve 310 remains in operation. As will more fully described, diagnostic test application 540 uses the PV and OP data to create a distinctive PV and OP data pattern for each mode of operation of control valve 310. Specifically, a PV and OP data pattern is created and recorded for 1) control valve 310 operating normally, and for 2) control valve 310 operating with each known type of valve fault. Test unit 400 compares these recorded PV and OP data patterns to PV and OP data patterns obtained from a control valve 310 under test. The comparison and matching of PV and OP data patterns enables test unit 400 to detect and identify valve faults in control valve 310.

Figure 6:
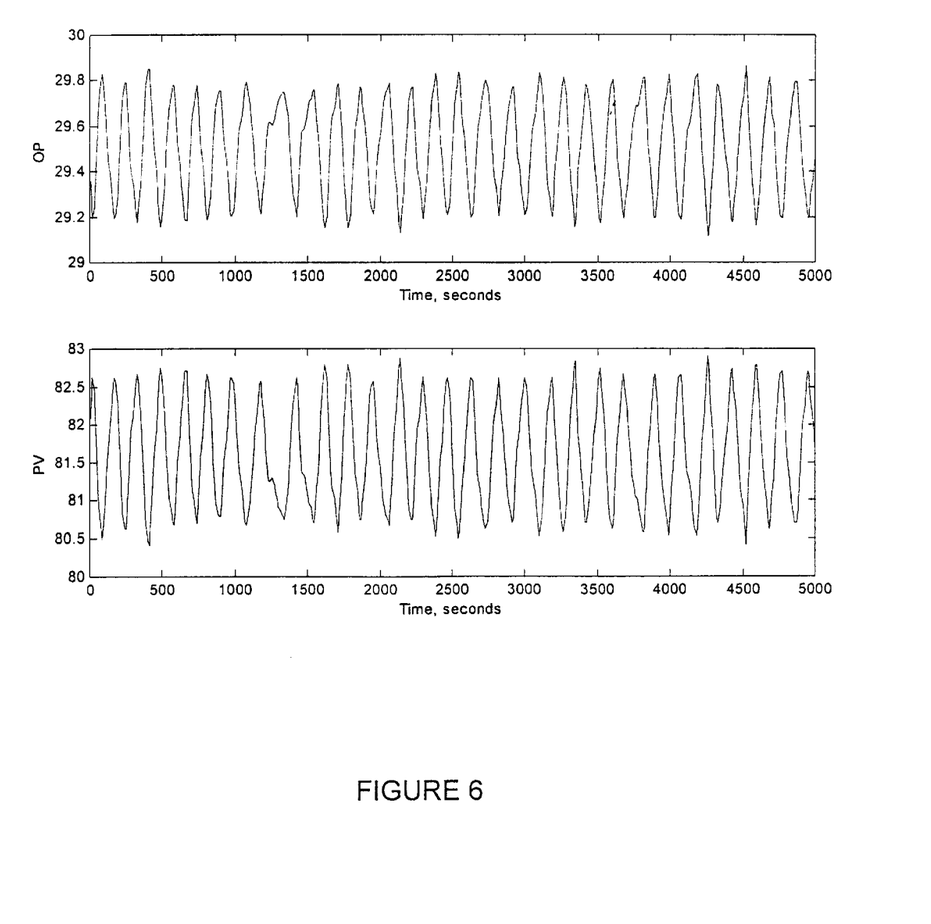
FIG. 6 illustrates a graph of process variable data versus time during normal operations of a control valve and a graph of output values of a controller versus time during normal operations of a control valve.

The system and method of the present invention will now be described in more detail. To prepare test unit 400 for diagnostic test operations, test unit 400 is first coupled to control valve 310 when control valve 310 is operating normally. Data acquisition unit 405 of test unit 400 measures values of the PV and OP signals that occur during normal operations of control valve 310 to obtain the "normal" values of the PV and OP data. The "normal" values of the PV and OP data are recorded in hard disk drive 420. FIG. 6 shows a graph of the PV data versus time during a normal operation of control valve 310. FIG. 6 also shows a graph of the OP data versus time for a normal operation of control valve 310. FIG. 6 shows only one of many different possible graphs for the normal operation of control valve 310. That is, there are many ways in which the values of the PV data and the OP data may change when control valve 310 is operating normally. Control valve 310 has multiple modes of normal operation.

CPU 435 executes computer instructions in diagnostic test application 540 to pre-process the PV and OP data. The goal of the pre-processing step is to improve the accuracy of the PV and OP data as a diagnostic tool for detecting valve faults in control valve 310.

The pre-processing step may comprise one or more of a number of individual pre-processing steps such as 1) statistical outlier removal, 2) autoscaling of data, 3) unbiasing of data, 4) first order differencing of data, 5) resampling data at higher frequencies, and 6) normalizing data with respect to variance and/or maximum value.

These individual pre-processing steps are generally known in the prior art. For example, statistical outlier removal is the process of deleting values of PV and OP data that lie outside a previously established outer limit. Statistical outliers in PV and OP data may be detected and eliminated using a method described on page 473 of a text entitled "Time Series Analysis." (Box, Jenkins and Reinsel, "Time Series Analysis," Prentice Hall, Englewood Cliffs, N.J., 1994).

Autoscaling a selected value involves subtracting the mean value of a series of values from the selected value and dividing the result by the standard deviation of the values. $PV_{AUTO}$ is the autoscaled value of PV.

$$PV_{AUTO} = (PV - \text{mean}(PV))/(\text{standard deviation}(PV)) \quad (1)$$

One method of unbiasing data is to subtract a filtered value of a selected value of data from its autoscaled counterpart. That is, $$PV_{UNBIASED} = PV_{AUTO} - PV_{FILTERED} \quad (2)$$

In Equation (2), $PV_{FILTERED}$ is $PV_{AUTO}$ (the autoscaled value of PV) filtered by a first order low pass filter with a break frequency one decade lower than the dominant frequency of $PV_{AUTO}$.

Figure 7:
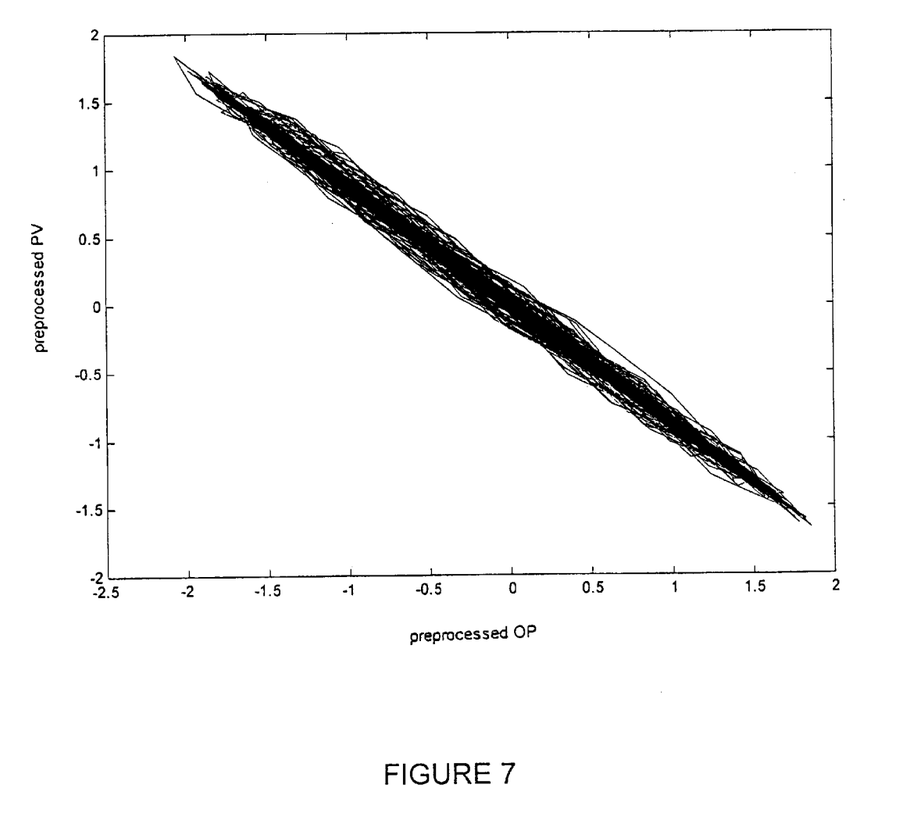
FIG. 7 illustrates a plot of the process variable data versus output values shown in FIG. 6 during normal operations of a control valve.

The pre-processed values of the PV and OP data are then plotted on a Cartesian co-ordinate graph of the type shown in FIG. 7. The ordinate of the graph is labeled "preprocessed PV" and has values from minus two (−2) to positive two (+2). The abscissa of the graph is labeled "preprocessed OP" and has values from minus two (−2) to positive two (+2).

FIG. 7 shows a plot of the pre-processed values PV versus the pre-processed values OP. The plot represents a PV and OP data pattern for one of the modes of normal operation of control valve 310. The data pattern is a narrow band of values decreasing from the upper left portion of the graph to the lower right portion of the graph. Whenever control valve 310 is exhibiting this type of PV and OP data pattern, then control valve 310 is operating normally. Of course, other modes of normal operation may create data patterns that have different shapes.

Test unit 400 is then coupled to control valve 310 when control valve 310 is experiencing a known valve fault. Assume that the known valve fault is the "stick-slip" valve fault that has been previously described. Data acquisition unit 405 of test unit 400 measures values of the PV and OP signals that occur during the "stick-slip" operations of control valve 310 to obtain the "stick-slip" values of the PV and OP data. The "stick-slip" values of the PV and OP data are recorded in hard disk drive 420. When control valve 310 is exhibiting the "stick-slip" valve fault, the values of the PV data cease oscillating relatively uniformly around one PV value and remain nearly constant during the "valve stick period."

Figure 8:
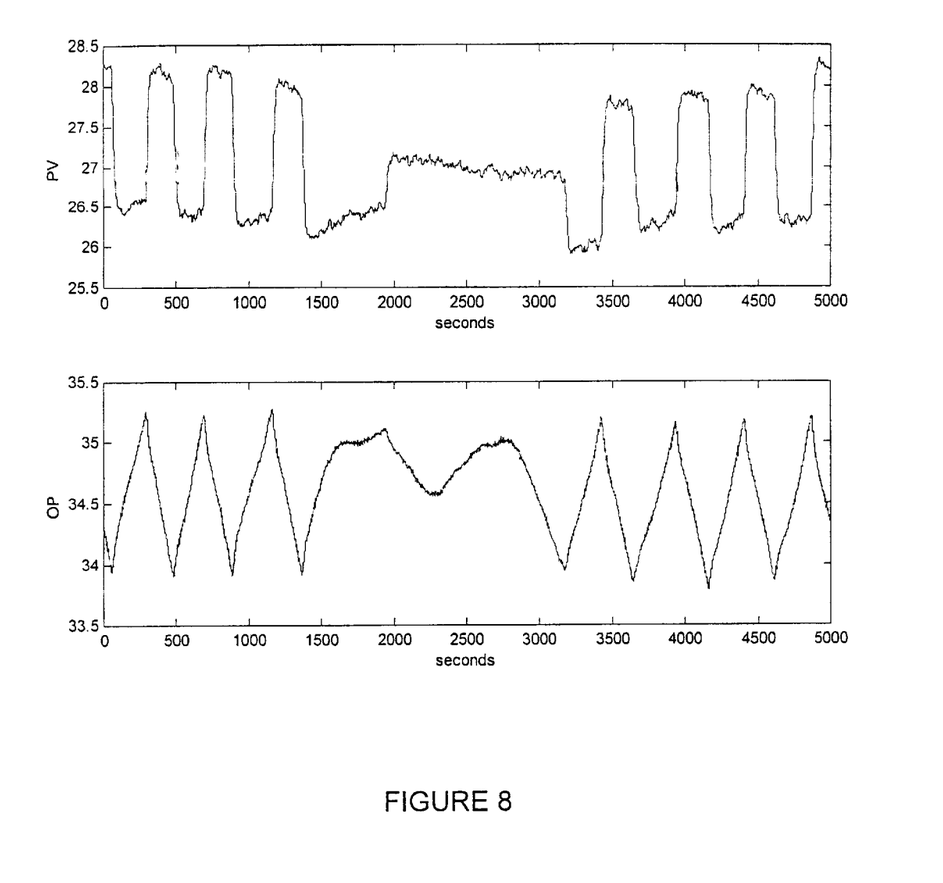
FIG. 8 illustrates a graph of process variable data versus time during an occurrence of a valve fault in a control valve and a graph of output values of a controller versus time during the same occurrence of the valve fault in the control valve.

FIG. 8 shows a graph of the PV data versus time during a "stick-slip" incident during the operation of control valve 310. The value of PV remains approximately constant (near the value 27.0) from the time value of approximately 2000 seconds to the time value of approximately 3200 seconds. Control valve 310 remained stuck for approximately 1200 seconds or twenty minutes. Following the end of "valve stick period" of twenty minutes, control valve 310 resumed normal operations.

FIG. 8 also shows a graph of the OP data versus time during the same "stick-slip" incident. During the time of the "valve stick period" the value of the OP data increases or decreases as controller 220 attempts to reduce the offset between the PV value and the setpoint value SP. When the change in the OP value is greater than the control valve resolution, the position of the control valve setting of control valve 310 slips abruptly and ceases to stick. This causes control valve 310 to return to normal operations. When control valve 310 is exhibiting the "stick-slip" valve fault, the values of the OP data cease oscillating relatively uniformly around one OP value and increase or decrease during the "valve stick period" as controller 220 attempts to free control valve 310 from its "valve stick" condition.

CPU 435 then executes computer instructions in diagnostic test application 540 to pre-process the PV and OP data obtained during the "stick-slip" valve fault. The pre-processing of the PV and OP data is the same as that previously described for the case of normal operations of control valve 310.

Figure 9:
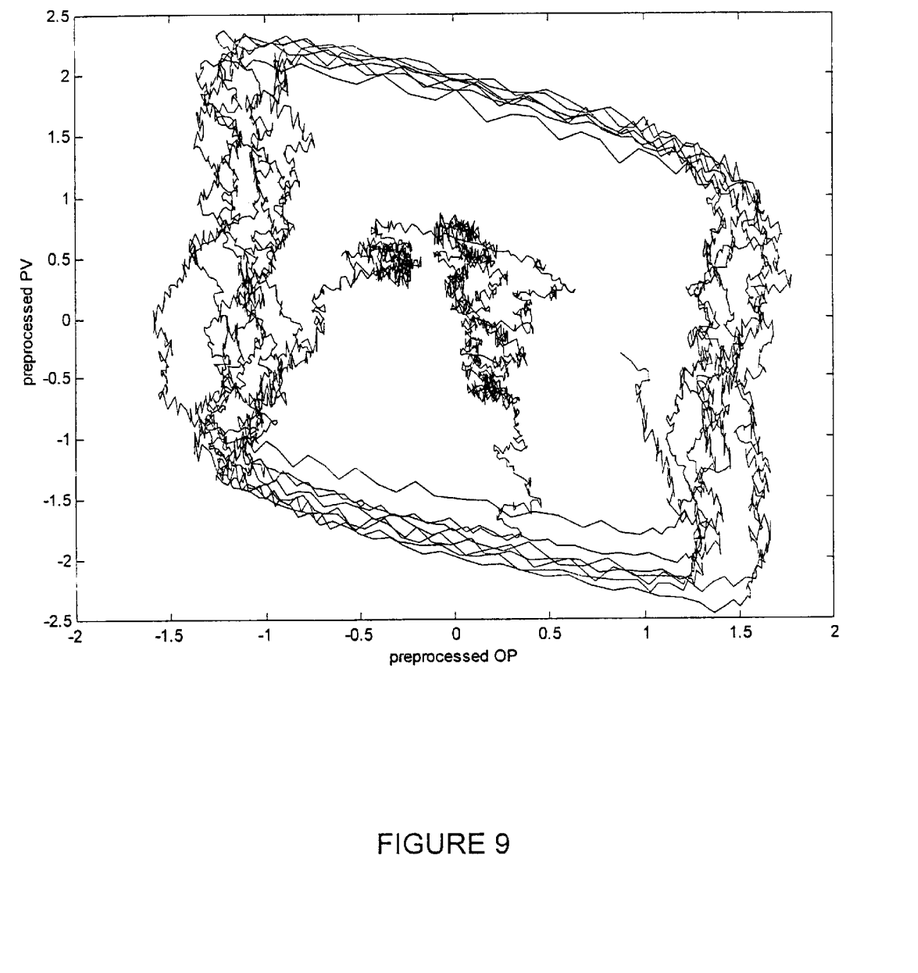
FIG. 9 illustrates a plot of the process variable data versus output values shown in FIG. 8 during the occurrence of the valve fault in the control valve.

The pre-processed values of the PV and OP data for the "stick-slip" valve fault are then plotted on a Cartesian co-ordinate graph of the type shown in FIG. 9. The ordinate of the graph is labeled "preprocessed PV" and has values from minus two point five (−2.5) to positive two point five (+2.5). The abscissa of the graph is labeled "preprocessed OP" and has values from minus two point five (−2.5) to positive two point five (+2.5). The normalization method that was used to create the graph shown in FIG. 9 was the method of scaling to unit variance. FIG. 9 shows a plot of the pre-processed values PV versus the pre-processed values OP for the "stick-slip" valve fault. The data pattern has an open rectangular shape due to a hysteresis of the PV and OP values. Whenever control valve 310 is exhibiting this PV and OP data pattern, then control valve 310 is experiencing a "stick-slip" valve fault condition.

Diagnostic test application 540 uses the PV and OP data from the "stick-slip" valve fault condition to create a distinctive PV and OP data pattern that indicates the presence of the "stick-slip" valve fault condition. Diagnostic test application 540 computes the area of the open rectangular shape and records the value of the area as a diagnostic scalar metric. For example, the value of the area of the rectangular shape shown in FIG. 9 is 11.68 normalized units. This large an area indicates severe hysteresis that is consistent with a "stick-slip" valve fault. Because the scalar metric is scalar number (i.e., number of square units of area) it may be utilized quickly and easily as a diagnostic tool.

Diagnostic test application 540 also records the shape of the graphical images that are formed by plotting the PV and OP data. The shape and the area of a graphical images represent a data pattern that is indicative of a particular state of operation of control valve 310. After diagnostic test application 540 has acquired PV and OP data patterns for all known valve faults, test unit 400 is ready for diagnostic testing operations. The PV and OP data pattern for normal operation and the PV and OP data patterns for all known valve faults may be collectively referred to as "diagnostic data patterns."

When test unit 400 is used to diagnose the operation of control valve 310, data acquisition unit 405 of test unit 400 is coupled to controller 220 in the manner previously described. Data acquisition unit 405 measures values of the PV and OP signals that occur during the operation of the control valve 310 under test. Test unit 400 then records the values of the PV and OP data. Test unit controller (comprising CPU 435 and diagnostic test application 540) uses the PV and OP data from the control valve 310 under test to create and analyze data patterns to detect and identify valve faults in control valve 310.

CPU 425 causes diagnostic test application 540 to execute computer instructions to pre-processes the PV and OP data in the manner previously described. Diagnostic test application 540 computes and records the shapes and areas of the images that are formed by plotting the PV and OP values from control valve 310 under test. Diagnostic test application 540 creates PV and OP data patterns from control valve 310 under test and compares them with previously stored diagnostic data patterns.

When diagnostic test application 540 determines that a data pattern from control valve 310 matches a diagnostic data pattern that represents a known valve fault (e.g., "stick-slip" valve fault), then diagnostic test application 540 causes a diagnostic message to be created and communicated to a test monitor (either a person or a recording machine). In one advantageous embodiment of the present invention, CPU 435 causes the diagnostic message to be displayed on display screen 425. An audio alarm may also be sounded on speaker 460.

It is a useful and valuable feature of the present invention that the diagnostic testing provided by test unit 400 does not require the control valve 310 under test to be taken out of operation during the diagnostic test.

Figure 10:
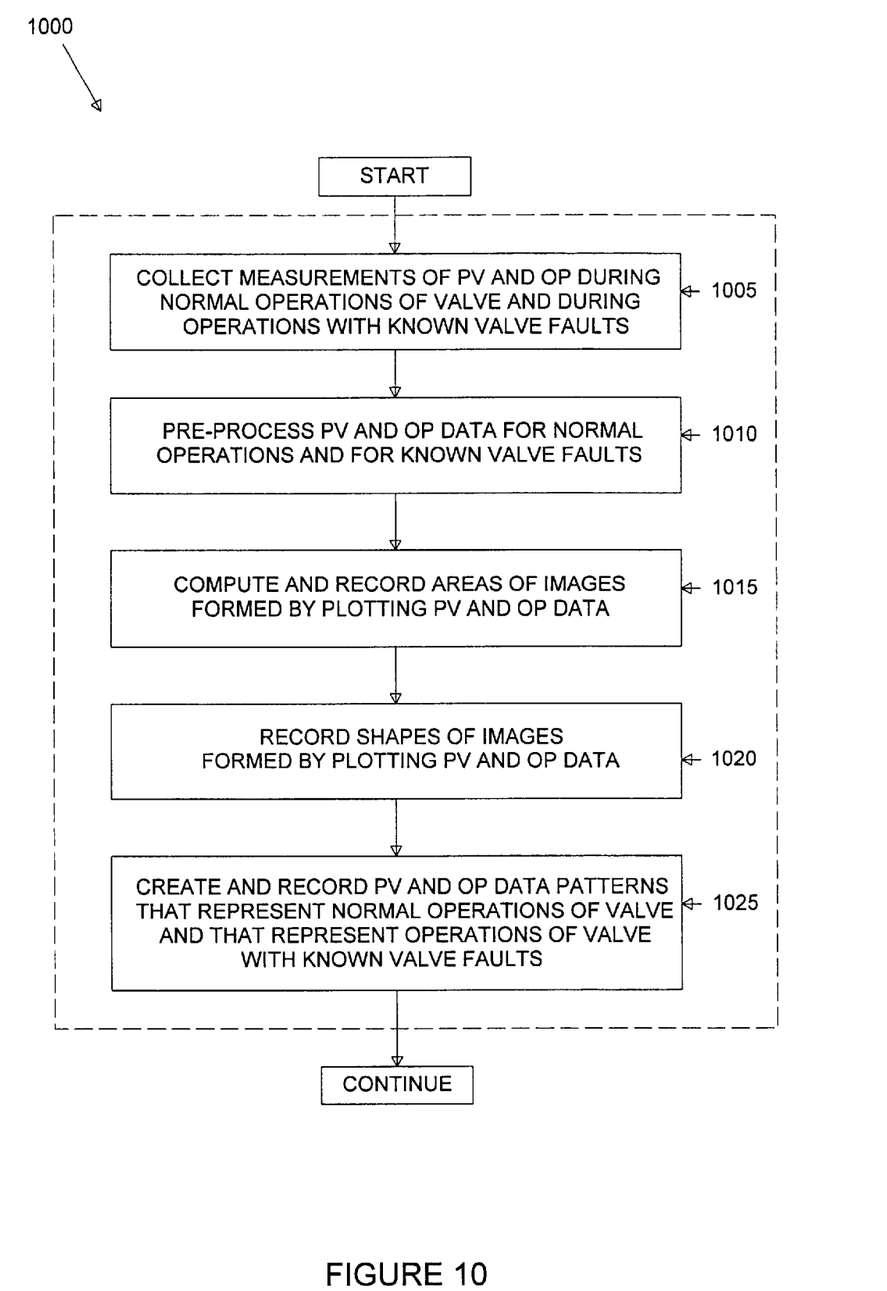
FIG. 10 is a first flow diagram illustrating one embodiment of the method of the present invention for preparing diagnostic signal patterns for use in the test unit of the present invention.

FIG. 10 depicts flow chart 1000 illustrating a method for preparing test unit 400 to do diagnostic testing according to one embodiment of the present invention. The process steps set forth in flow chart 1000 are executed by test unit 400 (comprising CPU 435 and diagnostic test application 540). In process step 1005, test unit 400 collects measurements of PV and OP data from control valve 310 when control valve 310 is operating normally. In addition, test unit 400 collects measurements of PV and OP data from control valve 310 when control valve 310 is experiencing a known valve fault. Test unit 400 collects measurements of PV and OP data from control valve 310 for each type of known valve fault.

In process step 1010, test unit 400 pre-processes PV and OP data for normal operations. In addition, test unit 400 pre-processes PV and OP data for each type of known valve fault. In process step 1015, test unit 400 computes and records the areas of images that are formed when the PV and OP values are plotted. Test unit 400 computes and records the areas of images for normal operations and for each type of known valve fault.

In process step 1020, test unit 400 records the shapes of images that are formed when the PV and OP values are plotted. Test unit 400 records the shapes of images for normal operations and for each type of known valve fault.

In process step 1025, test unit 400 creates and records a diagnostic data pattern that represents normal operation of control valve 310. In addition, test unit 400 creates and records a diagnostic data pattern that represents each type of known valve fault.

Figure 11:
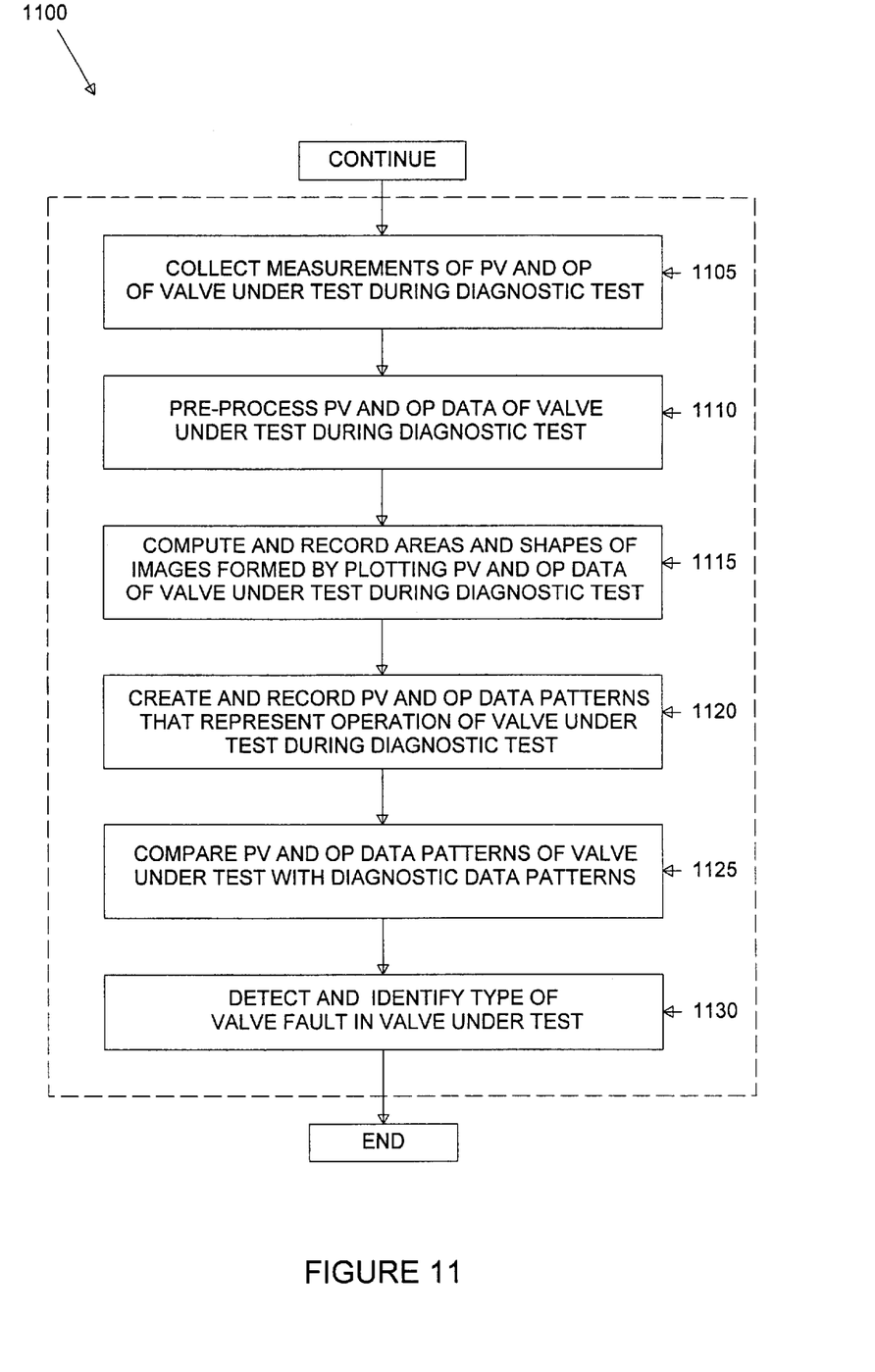
FIG. 11 is a second flow diagram illustrating one embodiment of the method of the present invention for testing a control valve using the test unit of the present invention.

FIG. 11 depicts flow chart 1100 illustrating a method for diagnosing control valve 310 according to an advantageous embodiment of the present invention. The process steps set forth in flow chart 1100 are executed by test unit 400 (comprising CPU 435 and diagnostic test application 540) after test unit 400 has been prepared as previously described.

In process step 1105, test unit 400 collects measurements of PV and OP data from control valve 310 under test when control valve 310 is operating. In process step 1110, test unit 400 pre-processes the PV and OP data from control valve 310 under test. In process step 1115, test unit 400 computes and records the areas of images that are formed when the PV and OP values are plotted. In addition, test unit 400 records the shapes of images that are formed when the PV and OP values are plotted.

In process step 1120, test unit 400 creates and records a data pattern that represents the operation of control valve 310 under test. In process step 1125, test unit 400 compares the data pattern of control valve 310 under test with previously recorded diagnostic data patterns. In process step 1130, test unit 400 matches the data pattern of control valve 310 under test with a diagnostic data pattern of a known valve fault. In this manner test unit 400 detects and identifies a known valve fault in the control valve 310 under test. As previously described, test unit 400 is capable of creating and sending a diagnostic message to a test monitor indicating that a valve fault has been detected and identifying the type of valve fault that has been detected.

The embodiment of present invention that has been described comprises an external test unit 400 that may be sequentially coupled to many different control valves 310. It is also possible, however, for test unit 400 to be permanently embedded or integrated into one control valve 310.

Although the present invention and its advantages have been described in detail, those skilled in the art should understand that they can make various changes, substitutions and alterations herein without departing from the spirit and scope of the invention in its broadest form.

What is claimed is:

1. An apparatus for detecting a valve fault in a control valve comprising:
   a test unit controller operable to form a data pattern from process variable data and output data associated with said control valve, and operable to compare said data pattern with a diagnostic data pattern of a valve fault, and when said data pattern matches said diagnostic data pattern, operable to determine that said control valve is experiencing a valve fault.

2. The apparatus as set forth in claim 1 wherein said control valve remains in operation while said test unit controller determines that said control valve is experiencing a valve fault.

3. The apparatus as set forth in claim 1 wherein said data pattern is an area of an image formed by plotting said process variable data versus said output data associated with said control valve, and said diagnostic data pattern of a valve fault is an area of an image formed by plotting said process variable data versus said output data associated with said valve fault.

4. The apparatus as set forth in claim 3 wherein said data pattern further comprises the shape of said image formed by plotting said process variable data versus said output data associated with said control valve, and said diagnostic data pattern of said valve fault further comprises the shape of said image formed by plotting said process variable data versus said output data associated with said valve fault.

5. The apparatus as set forth in claim 1 wherein said test unit controller is operable to form a data pattern from process variable data and output data associated with said control valve, and operable to compare said data pattern with a diagnostic data pattern of a normal operation of said control valve, and when said data pattern matches said diagnostic data pattern, operable to determine that said control valve is not experiencing a valve fault.

6. The apparatus as set forth in claim 1 wherein said test unit controller is operable to compare said data pattern with each of a plurality of diagnostic data patterns of known valve faults, and when said data pattern matches one of said plurality of diagnostic data patterns, operable to determine the identity of the valve fault that said control valve is experiencing.

7. The apparatus as set forth in claim 1 wherein said apparatus for detecting a valve fault in a control valve comprises:
   a test unit operable to be coupled to a feedback controller that is coupled to said control valve, said test unit operable to obtain from said feedback controller process variable data and output data associated with said control valve, said test unit comprising:
      a test unit controller operable to form a data pattern from said process variable data and output data associated with said control valve, and operable to compare said data pattern with a diagnostic data pattern of a valve fault, and when said data pattern matches said diagnostic data pattern, operable to determine that said control valve is experiencing a valve fault.

8. A process control system comprising at least one process controller for controlling a control valve, wherein said at least one process controller for controlling said control valve comprises an apparatus for detecting a valve fault in said control valve, wherein said apparatus comprises:
   a test unit controller operable to form a data pattern from process variable data and output data associated with said control valve, and operable to compare said data pattern with a diagnostic data pattern of a valve fault, and when said data pattern matches said diagnostic data pattern, operable to determine that said control valve is experiencing a valve fault.

9. The process control system as set forth in claim 8 wherein said control valve remains in operation while said test unit controller determines that said control valve is experiencing a valve fault.

10. The process control system as set forth in claim 8 wherein said data pattern is an area of an image formed by plotting said process variable data versus said output data associated with said control valve, and said diagnostic data pattern of a valve fault is an area of an image formed by plotting said process variable data versus said output data associated with said valve fault.

11. The process control system as set forth in claim 10 wherein said data pattern further comprises the shape of said image formed by plotting said process variable data versus said output data associated with said control valve, and said diagnostic data pattern of said valve fault further comprises the shape of said image formed by plotting said process variable data versus said output data associated with said valve fault.

12. The process control system as set forth in claim 8 wherein said test unit controller is operable to form a data pattern from process variable data and output data associated with said control valve, and operable to compare said data pattern with a diagnostic data pattern of a normal operation of said control valve, and when said data pattern matches said diagnostic data pattern, operable to determine that said control valve is not experiencing a valve fault.

13. The process control system as set forth in claim 8 wherein said test unit controller is operable to compare said data pattern with each of a plurality of diagnostic data patterns of known valve faults, and when said data pattern matches one of said plurality of diagnostic data patterns, operable to determine the identity of the valve fault that said control valve is experiencing.

14. The process control system as set forth in claim 8 wherein said apparatus for detecting a valve fault in said control valve comprises:
   a test unit operable to be coupled to a feedback controller that is coupled to said control valve, said test unit operable to obtain from said feedback controller process variable data and output data associated with said control valve, said test unit comprising:
      a test unit controller operable to form a data pattern from said process variable data and output data associated with said control valve, and operable to compare said data pattern with a diagnostic data pattern of a valve fault, and when said data pattern matches said diagnostic data pattern, operable to determine that said control valve is experiencing a valve fault.

15. A method for detecting a valve fault in a control valve comprising the steps of:
   forming a data pattern from process variable data and output data associated with said control valve;
   comparing said data pattern with a diagnostic data pattern of a valve fault; and
   determining that said control valve is experiencing a valve fault when said data pattern matches said diagnostic data pattern.

16. The method as set forth in claim 15 further comprising the step of:
   causing said control valve to remain in operation while determining that said control valve is experiencing a valve fault.

17. The method as set forth in claim 15 further comprising the steps of:
   plotting said process variable data versus said output data associated with said control valve;
   calculating a first area of a first image formed by plotting said process variable data versus said output data associated with said control valve;
   selecting said first area to be said data pattern for said control valve;

plotting process variable data versus output data associated with a valve fault;

calculating a second area of a second image formed by plotting said process variable data versus said output data associated with said valve fault; and selecting said second area to be said diagnostic data pattern for said valve fault.

18. The method as set forth in claim 17 further comprising the steps of:

selecting said first area and the shape of said first image to be said data pattern for said control valve; and selecting said second area and the shape of said second image to be said diagnostic data pattern for said valve fault.

19. The method as set forth in claim 15 further comprising the steps of:

selecting said diagnostic data pattern to be a diagnostic data pattern of a normal operation of said control valve; and determining that said control valve is not experiencing a valve fault when said data pattern matches said diagnostic data pattern.

20. The method as set forth in claim 15 further comprising the steps of:

comparing said data pattern with each of a plurality of diagnostic data patterns of known valve faults; and determining the identity of the valve fault that said control valve is experiencing when said data pattern matches one of said plurality of diagnostic data patterns.

21. For use in a process control system comprising at least one process controller for controlling a control valve, computer-executable instructions stored on a computer-readable storage medium for detecting a valve fault in said control valve, the computer-executable instructions comprising the steps of:

forming a data pattern from process variable data and output data associated with said control valve;

comparing said data pattern with a diagnostic data pattern of a valve fault; and determining that said control valve is experiencing a valve fault when said data pattern matches said diagnostic data pattern.

22. The computer-executable instructions stored on a computer-readable storage medium as set forth in claim 21 further comprising the step of:

causing said control valve to remain in operation while determining that said control valve is experiencing a valve fault.

23. The computer-executable instructions stored on a computer-readable storage medium as set forth in claim 21 further comprising the steps of:

plotting said process variable data versus said output data associated with said control valve;

calculating a first area of a first image formed by plotting said process variable data versus said output data associated with said control valve;

selecting said first area to be said data pattern for said control valve;

plotting process variable data versus output data associated with a valve fault;

calculating a second area of a second image formed by plotting said process variable data versus said output data associated with said valve fault; and selecting said second area to be said diagnostic data pattern for said valve fault.

24. The computer-executable instructions stored on a computer-readable storage medium as set forth in claim 23 further comprising the steps of:

selecting said first area and the shape of said first image to be said data pattern for said control valve; and selecting said second area and the shape of said second image to be said diagnostic data pattern for said valve fault.

25. The computer-executable instructions stored on a computer-readable storage medium as set forth in claim 21 further comprising the steps of:

selecting said diagnostic data pattern to be a diagnostic data pattern of a normal operation of said control valve; and determining that said control valve is not experiencing a valve fault when said data pattern matches said diagnostic data pattern.

26. The computer-executable instructions stored on a computer-readable storage medium as set forth in claim 21 further comprising the steps of:

comparing said data pattern with each of a plurality of diagnostic data patterns of known valve faults; and determining the identity of the valve fault that said control valve is experiencing when said data pattern matches one of said plurality of diagnostic data patterns.

* * * * *